March 16, 1948.  J. W. ARMBRUSTER  2,437,674
CONTAINER SAFETY LOCK
Filed Aug. 8, 1942
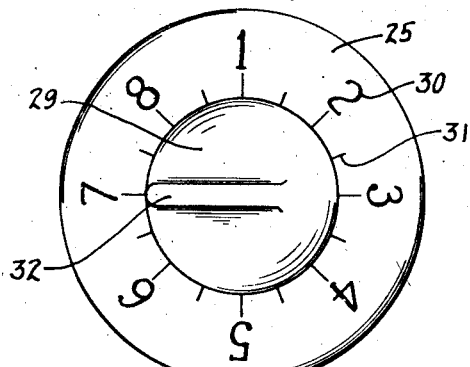
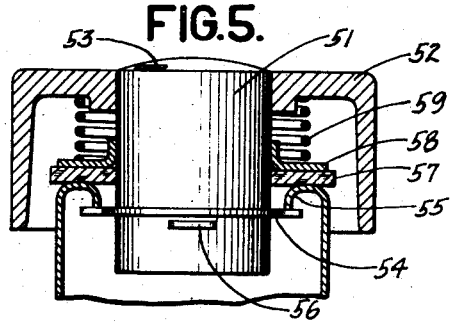
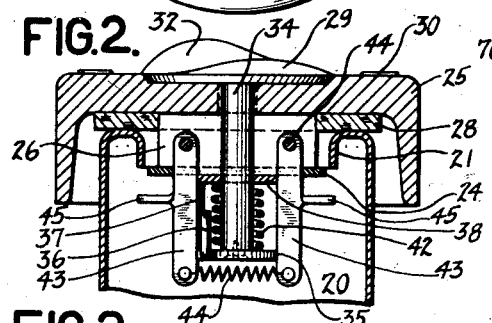
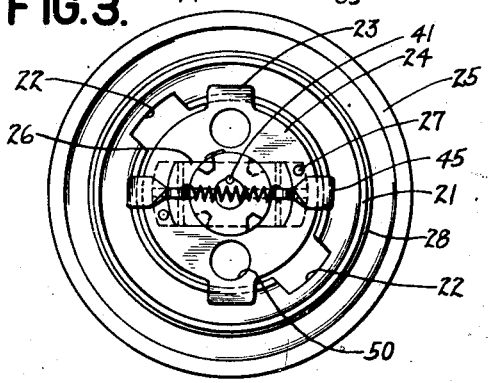
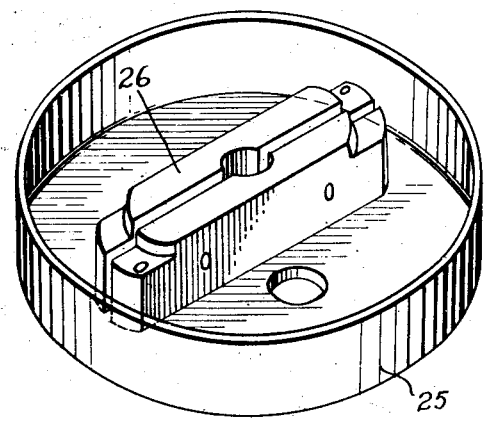
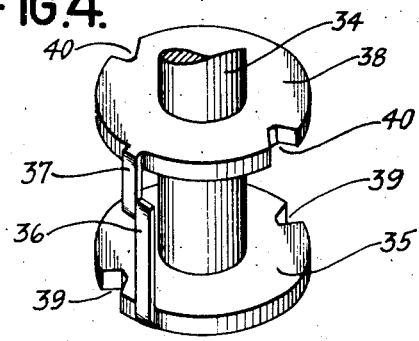
INVENTOR
John W. Armbruster Patented Mar. 16, 1948

2,437,674

UNITED STATES PATENT OFFICE 2,437,674

CONTAINER SAFETY LOCK

John W. Armbruster, East Rockaway, N. Y.

Application August 8, 1942, Serial No. 454,118

6 Claims. (Cl. 70—173)

1

This invention relates generally to improvements in locks for container covers and more specifically to the provision of pressure relief valves incorporated in, or cooperating with, such locks.

An object of the invention is to provide a locking device which also acts as a valve.

Another object of the invention is to provide a combination lock with a manipulative knob, said knob also serving as the head of a pressure relief valve.

Another object of the invention is the provision of an improved valve with a valve stem in the form of a lock, or a portion of a lock.

A further object of the invention is to provide an inexpensive form of cap or cover for containers of volatile matter, said cap having devices for not only preventing theft, but also preventing fire and explosion in automobile tanks or other containers.

A feature of the invention is the provision of a valve stem with cooperating devices for operating the holding lugs of a lock.

A still further object of the invention is the use of a flexible washer construction in cooperation with a lock to provide a pressure relief opening in a tank cover.

A feature of the invention is the provision of a gas tank cap with a freely rotating latch and washer ring for locking the cap on the tank. In said cap is a valve including a lock which may be operated to fix the latch ring with respect to the cap so that it can be removed.

Other objects, features and their advantages will appear from a reading of the following description which describes, among other things, many novel features of construction and novel combinations of parts present in the different embodiments of the invention shown in the accompanying drawings.

In the drawings:

Fig. 1 is a plan view showing the combination dial on the top of the cap.

Fig. 2 is a sectional elevation view taken through the center of the cap and showing the valve and combination lock parts.

Fig. 3 is bottom view of the cap showing the arrangement of the combination lock parts.

Fig. 4 is a perspective view of the two-combination locking discs.

Fig. 5 is a sectional view of an alternative form of cap with lock and valve, the lock being of the key-operated kind.

Fig. 6 is a sectional view of a third form of cover with a lock and a valve; the lock being of the freely turning variety requiring a key to lock the cover parts together rather than lock the cover to a container.

Fig. 7 is a perspective view of the inside of the cap shown in Figs. 1, 2 and 3 showing a divided interior boss.

In a divisional application, Serial No. 750,795, filed on May 27, 1947, there are set forth claims to key operated locks in safety valves on container covers. This parent case sets forth claims to the combination locks and associated safety valves for containers.

Figs. 1–4 are concerned with a manipulative combination lock, while Fig. 5 shows a key operated lock, and Fig. 6 reveals a key operated lock with a freely turning latch.

In Fig. 2 it is seen that a gas tank or other container 20 has a filler opening with a latching flange 21. This flange is cut out with a pair of opposite notches 22, Fig. 3, to provide assembly openings for the pair of extensions 23 on a circular catch plate or latch 24 which is fastened beneath the center of a cap or cover 25. As seen in Figs. 2 and 3, the cover is shaped as an inverted cup in the center of which is a divided boss 26 to which the catch plate is attached. The boss is flat on two sides and formed with four short segmental shelves on which plate 24 is held and fastened by a pair of pins 27. In Fig. 3 the four shelves are defined by the dotted outline of the curved ends of boss 26, said curved ends extending beyond the curved full lines defining the top edge of the boss.

Fitted inside the cap 25 and surrounding the base of the boss 26 is an annular washer 28 of cork, rubber or other resilient material.

The cap is assembled on a container by placing it over the filler opening with the extensions 23 coinciding with the notches 22 of the flange 21 and then pressing downward and turning to catch the extensions under the unnotched inner portions of the flange, as shown in Fig. 3.

A simple but efficient combination lock is assembled in the center of the cap and arranged to cooperate with the catch plate to hold the cap on the container until a central knob 29 is turned back and forth certain specific angles corresponding to predetermined numbers 30 arranged radially on the top of the cap 25. The numbers 30 and the half marks 31 are embossed so that they can be sensed in the dark. Knob 29 is formed with a vertical web 32 which is not only a grasping means but also a pointer for setting the combination required to open the lock. As illustrated, the lock is responsive to a two-number combination 2–7½, but of course other legends such as letters may be used, or a larger number of dial numbers and combinations can be employed.

Knob 29 is on a stem 34 which projects down through a central opening in the cap 25. At its lower end is fastened a combination disc 35 which has an upwardly extending extension 36 cooperating with an extension 37 projecting down from a second combination disc 38 loosely pivoted on the stem. The discs are circular but are formed with pairs of notches, two notches 39 in the periphery of disc 35 and a pair of notches 40 in disc 38, said notches being spaced at 180° intervals on the discs. The location of these notches vary with respect to the stem 34 and extensions 36 and 37 for different locks for a variety of combinations.

Disc 35 is not only riveted on the end of stem 34, but it is also held in position by a feather pin 41, Fig. 3.

Pressing between the two discs is a compression spring 42, Fig. 2 which not only holds knob 29 down into a recess formed as a valve seat in the top of cap 25, but also presses the combination disc 38 into frictional contact with the underside of catch plate 24 so that it remains in an adjusted position.

The combination lock includes a pair of locking levers 43 cooperating with the discs. In Fig. 3 it is seen that the boss 26 is slotted at right angles to the catch plate extensions 23, and it is in this slot that the levers 43 are pivoted on pins 44 driven through the shoulder. The levers are held in contact with the periphery of the discs by a spring 44 attached to the ends of the levers.

In Fig. 2, levers 43 are shown in the locking position resting on the outer edge of the discs so that a pair of lugs 45 on the levers are under the flange 21. Then the cap cannot be removed, because even though the cap may be turned to put the catch plate extensions 23 under notches 22, the lugs 45 catch under the uncut part of the flange. In order to unlock the cap, the lugs 45 must be swung inward, and that is what is allowed by the notches 39 and 40 of the discs when properly adjusted.

As shown, the top disc 38 is first adjusted by turning the combination knob 29 and stem 34, Figs. 1 and 4, in a clockwise direction. Then the extension 36 engages extension 37 and rocks it and disc 38 in the same direction. The knob is turned until web 32 points to "2" and then notches 40 lie directly under levers 43. However, the levers do not move because they are still supported by disc 35. Counterclockwise movement of knob 29 brings disc 35 back to the "7½" position at which point both sets of notches 39 and 40 are aligned under the levers 43 and spring 44 pulls them together and rocks lugs 45 within the inside diameter of flange 21. Then the cap is free to be lifted off the tank.

It is noted that the sides of notches 39 and 40 are slanted and the inner edges of levers 43 are to be rounded so they are easily cammed out of the notches and over the extensions 36 and 37. Notches 39 can be deeper than notches 40 to allow for the distance from pivots 44. When cap 25 is again put on the tank, one or more revolutions of the knob 29 will put the discs in locking positions so that only the holder of the combination is able to unlock it. If a more difficult combination is desired, another disc such as disc 38 can be placed adjacent thereto with another arrangement of notches.

Knob 29 and stem 34 serve not only as a lock manipulator, but also as part of a vent valve for relief of dangerous pressures that may build up in the container. In Fig. 2 it is apparent that the parts on and associated with stem 34 do not interfere with its vertical movement. Disc 35 can slide up and down alongside the lock levers and extension 36 can slide alongside extension 37. Spring 42 acts as a valve spring to resist lifting movement of knob 29 as a valve and keep it seated.

A pair of holes 50 are cut in plate 24 and similar holes are cut in the top of the cap to conduct pressure in the tank to the underside of knob 29. Latch openings 22 also serve as communicating passages to the valve head. When a predetermined pressure is reached inside the tank (a pressure corresponding to the strength of spring 42) knob 29 is lifted thereby to relieve the pressure to the atmosphere outside the tank. Spring 42 is compressed but tends to restore the valve to its seat as soon as the pressure is lowered to a safer level.

The modification shown in Fig. 5 includes a key operated lock 51 which is fastened in the center of the cap 52. Slot 53 is a key opening. Fastened to the lock plate 51 is a catch plate 54 for engaging under the filler opening flange 55. Also extending under flange 55 are a pair of key operated lugs 56 normally extended but depressed by any well known mechanism inside lock 51 so that the cap may be withdrawn.

The washer construction of Fig. 5 acts as a pressure relief valve. Resilient washer 57 is backed by a steel ring 58 which is flanged to slide on the barrel of lock 51 and against which a compression spring 59 presses. The spring bears against the underside of cap 52 and holds the washer 57 in a sealing position. However, when a certain pressure is built up in the tank, washer 57 lifts and ring 58 is slid up on the lock against the pressure of spring 59 which restores the parts when the pressure is lowered.

The third modification shown in Fig. 6 includes a lock 60 which is formed with a valve head 61 in which is a key opening 62. The lock is free to slide vertically in the center of a cap 63 which is perforated with valve openings 64 under 61. A spring 65 presses between a shoulder 66 on lock 60 and the underside of the valve seat.

Extending from lock 60 are a pair of locking lugs 67 which pass through vertical slots in the side of the boss 68 of cylindrical shape extending down inside the center of the cap.

On the outside of boss 68 is a freely turning ring 69 with an annular flange 70 upon which is mounted a metal ring 71 and a resilient washer 72. Assembled fast on the lower edge of ring 69 is a catch plate 73 with a pair of extensions 74 engaging under a filler opening flange 75. The outer wall of boss 68 (Fig. 6) is tapered upward, i. e., shaped slightly conical with an enlarged lower end which holds ring 69 therein and fixed axially, but allows it to turn freely for rotation when unlocked.

The construction is such that when the cap is put on the tank and locked, cap 63 is free to turn with respect to the ring 69. Therefore the cap cannot be removed because catch plate 73 remains latched. It is only when a key is inserted in opening 62 and lugs 67 are extended to engage vertical slots or ratchet openings 77 in the wall of ring 69, that the catch plate is stationary with respect to the cap and removable from the flange. Lugs 67 may be pointed or slanted as ratchet teeth to engage any of a number of slots 77 cut around ring 69.

The upper end of spring 65 is rounded to permit free turning of cap 63.

Although lock 60 is effective to couple the cap and the catch plate, it is also effective as a valve. When a predetermined pressure is reached in the container, it is directed through openings 64 against the underside of valve head 61. The lock 60 then rises as a valve to allow escape of the pressure. It is free to do so because of the slotted construction of boss 68 and ring 69. An opening in the center of catch plate 73 leads to the valve openings.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While, in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

Having thus described my invention, I claim:

1. A cap for covering the filler opening of a container of volatile material, said filler opening being formed with a notched flange, a series of raised radial combination character marks on said cap, a valve with a stem rotatably supported in the center of said cap, said valve having a head with an extending web formed as a pointer in cooperation with said marks and also as a grasping means for rotation of said valve differential amounts, a catch plate on said cap for engaging said flange, said plate having a pair of engaging extensions, a locking lever pivoted on said cap at right angles to a line through said extensions and formed with a lug to engage said flange, a pair of combination discs with differentially located notches with which said lever cooperates, one of said discs being fastened to the end of said valve stem and the other rotatable thereon, an operating extension on the fastened disc cooperating with an extension on the other disc to adjust it when the valve is turned, and a spring between said discs for holding the valve closed and pressing the free disc into frictional contact with the cap.

2. In a device of the class described, a cover for a container with an opening having a latching flange, a catch plate on said cover to engage said flange, a pressure relief opening in the cover, a manipulative lock on said cover with lock parts for engaging said flange, a part of said lock being movable relative to the cover and other lock parts, a valve head on said lock part, and resilient means for normally holding said head closed over said pressure relief opening.

3. A cap for covering the filler opening of a container, said filler opening being formed with a notched flange, a series of raised radial combination character marks on said cap, a locking knob with a stem rotatably supported in the center of said cap, said knob having an extending web formed as a pointer in cooperation with said marks and also as a grasping means for rotation of said knob differential amounts, a catch plate on said cap for engaging said flange, said plate having a pair of engaging extensions, a locking lever pivoted on said cap at right angles to a line through said extensions and formed with a lug to engage said flange, a pair of combination discs with differentially located notches with which said lever cooperates, one of said discs being fastened to the end of said stem and the other rotatable thereon, an operating extension on the fastened disc cooperating with an extension on the other disc to adjust it when the knob is turned, and a spring between said discs for pressing the free disc into frictional contact with the cap.

4. A container with a cap holding flange, a cap with means to engage said flange and a combination lock in said cap, said lock comprising a movable latching element with a lug, and a plurality of notched combination discs abutting said element, whereby said lug is brought into cooperation with said flange by said lock for locking said cap on said container.

5. A cover for a container, said cover formed with a valve opening, a manipulative valve in said opening, a spring on said valve to hold it normally closed over said opening, locking mechanism for locking said cover to said container, and means under control of said valve when manipulated for operating said mechanism.

6. A cap for a container, a lock on said cap for locking it on said container, a portion of said lock being formed with a circular valve head seated in a recess in said cap and having a tapered projection to provide for rotative locking control but prevent outward axial manipulation, means in said lock and controlled by said head to perform locking, and a resilient means to hold the valve head seated but free for outward movement under internal pressure.

JOHN W. ARMBRUSTER.

REFERENCES CITED

The following references are of record in the file of this patent:

UNITED STATES PATENTS

| Number | Name | Date |
| --- | --- | --- |
| 2,147,727 | White et al. | Feb. 21, 1939 |
| 2,164,450 | Eshbaugh et al. | July 4, 1939 |
| 1,989,979 | Greenberg | Feb. 5, 1935 |
| 961,088 | Reynolds | June 7, 1910 |
| 977,337 | Soley | Nov. 29, 1910 |
| 1,106,837 | Pfaehler et al. | Aug. 11, 1914 |
| 1,521,093 | Hall | Dec. 30, 1924 |
| 1,630,672 | Sage | May 31, 1927 |
| 1,689,979 | Tate et al. | Oct. 30, 1928 |
| 1,849,746 | Jespersen | Mar. 15, 1932 |
| 1,867,650 | Bryan | July 19, 1932 |
| 1,968,506 | Schneider | July 31, 1934 |
| 2,005,469 | Nelson et al. | June 18, 1935 |
| 2,308,892 | Miller | Jan. 19, 1943 |